United States Patent
Kim

(10) Patent No.: US 11,774,960 B2
(45) Date of Patent: Oct. 3, 2023

(54) VEHICLE CONTROL DEVICE FOR ARTICLE TRANSPORT SYSTEM IN PRODUCTION FACTORY AND METHOD OF OPERATING THE SAME

(71) Applicant: SEMES CO., LTD., Cheonan-si (KR)

(72) Inventor: Seung Hyen Kim, Hwaseong-si (KR)

(73) Assignee: SEMES CO., LTD., Cheonan-si (KR)

( * ) Notice: Subject to any disclaimer, the term of this patent is extended or adjusted under 35 U.S.C. 154(b) by 73 days.

(21) Appl. No.: 17/404,937

(22) Filed: Aug. 17, 2021

(65) Prior Publication Data
US 2022/0057793 A1 Feb. 24, 2022

(30) Foreign Application Priority Data

Aug. 18, 2020 (KR) .................. 10-2020-0103443

(51) Int. Cl.
| | |
|---|---|
| *G05D 1/00* | (2006.01) |
| *G05D 1/02* | (2020.01) |
| *H04W 24/04* | (2009.01) |
| *H04W 4/40* | (2018.01) |

(52) U.S. Cl.
CPC ......... *G05D 1/0022* (2013.01); *G05D 1/0212* (2013.01); *G05D 1/0276* (2013.01); *H04W 4/40* (2018.02); *H04W 24/04* (2013.01); *G05D 2201/0216* (2013.01)

(58) Field of Classification Search
CPC .............. G05D 1/0212; G05D 1/0276; G05D 2201/0216; H04W 24/04
See application file for complete search history.

(56) References Cited

U.S. PATENT DOCUMENTS

| | | | |
|---|---|---|---|
| 2012/0136516 A1* | 5/2012 | Harasaki | G05D 1/0289 |
| | | | 701/19 |
| 2018/0295558 A1 | 10/2018 | Kang | |
| 2020/0264630 A1* | 8/2020 | Sakurada | H04B 17/318 |

FOREIGN PATENT DOCUMENTS

| | | | | |
|---|---|---|---|---|
| KR | 10-2017-0071803 | | 6/2017 | |
| KR | 10-2017-0091288 | | 8/2017 | |
| KR | 2017-0091288 | * | 8/2017 | ............... G08G 1/00 |
| KR | 10-2018-0080872 | | 7/2018 | |

OTHER PUBLICATIONS

KR 2017-0091288 A machine translation (Year: 2017).*

* cited by examiner

*Primary Examiner* — Anne Marie Antonucci
*Assistant Examiner* — Jingli Wang

(57) ABSTRACT

A method of operating a vehicle control device for an article transport system in a production factory include identifying a first access point that is disabled from communicating with the vehicle control device among access points for performing wireless communication with respective vehicles in the production factory, identifying a first vehicle positioned in a disabled communication region corresponding to a coverage of the first access point, and transmitting a first message, which is intended to be transmitted to the first vehicle, to a second vehicle connected to a second access point and transmitting a second message for instructing the second vehicle to move to the disabled communication region.

20 Claims, 18 Drawing Sheets

VEHICLE CONTROL DEVICE FOR ARTICLE TRANSPORT SYSTEM IN PRODUCTION FACTORY AND METHOD OF OPERATING THE SAME

CROSS-REFERENCE TO RELATED APPLICATIONS

This application claims the priority of Korean Patent Application No. 10-2020-0103443 filed on Aug. 18, 2020, in the Korean Intellectual Property Office, the disclosure of which is incorporated herein by reference.

BACKGROUND

Technical Field

The present disclosure relates to a vehicle control device for an article transport system in a production factory and a method of operating the vehicle control device, and more particularly, to an apparatus for and a method of performing communication between a vehicle control device and a vehicle when communication is disabled between the vehicle control device and a specific wireless router (access point) due to a failure of a wired network.

Description of the Related Art

A process of manufacturing a semiconductor (or a display) refers to a process of manufacturing a semiconductor element on a substrate (e.g., a wafer) and includes exposure, deposition, etching, ion-doping, cleaning, packaging, and the like, for example. A production factory for manufacturing semiconductor elements includes clean rooms disposed in a single layer or multiple layers, and manufacturing apparatuses for performing semiconductor manufacturing processes are disposed in the layers.

To maximize the efficiency of the semiconductor manufacturing process, there have been introduced a method of improving the semiconductor manufacturing process as well as a technique for quickly and efficiently transporting articles (e.g., substrates) between the production facilities. Representatively, an overhead hoist transport (OHT) system for transporting the article along a route installed on a ceiling of the semiconductor production factory is applied. In general, the OHT system includes a rail which constitutes the movement route, and a vehicle which transports the article while moving along the rail. In addition, a storage system may be provided to store the articles when the articles need to be stored during the process of transporting the articles between the semiconductor production facility.

Meanwhile, a vehicle control device or system for controlling the vehicle may be provided in the production factory. The vehicle control device assigns tasks through communication with the vehicle and monitors a state of the vehicle. The vehicle communicates with the vehicle control device through an access point (AP) that provides wireless communication. The access point may be connected to the vehicle control device through a wired network (e.g., a local area network (LAN)). When some of the wired networks are failed, the communication between the specific access point and the vehicle control device is disconnected, and the vehicle, which is positioned within a coverage, a region in which the corresponding access point provides wireless connection, cannot communicate with the vehicle control device.

SUMMARY

The present disclosure has been made to provide an apparatus and a method, which are capable of enabling a vehicle, which is positioned within a coverage of an access point in a state in which the vehicle is disabled from communicating with a vehicle control device, to communicate with the vehicle control device.

The object of the present disclosure is not limited to the above-mentioned object, and other objects, which are not mentioned above, may be clearly understood by those skilled in the art from the following descriptions.

An embodiment of the present disclosure provides a method of operating a vehicle control device for an article transport system in a production factory, the method including: identifying a first access point that is disabled from communicating with the vehicle control device among access points for performing wireless communication with respective vehicles in the production factory; identifying a first vehicle positioned in a disabled communication region corresponding to a coverage of the first access point; and transmitting a first message, which is intended to be transmitted to the first vehicle, to a second vehicle connected to a second access point and transmitting a second message for instructing the second vehicle to move to the disabled communication region.

In the embodiment, the first message may include identification information on the first vehicle, a target movement position of the first vehicle, and information on a task assigned to the first vehicle.

In the embodiment, the second message may include a position of the disabled communication region and an instruction to transmit the first message to the first access point.

In the embodiment, the identifying of the first access point that is disabled from communicating with the vehicle control device may include determining that the first access point is in a disabled communication state when the vehicle control device is disabled from receiving a signal from the first access point for a predetermined period of time or a predetermined number of times or more.

In the embodiment, the method of operating the vehicle control device may further include receiving a response message from the first vehicle through a third access point.

Another embodiment of the present disclosure provides a vehicle control device for an article transport system in a production factory, the vehicle control device including: a communication module configured to communicate with access points for performing wireless communication with respective vehicles in the production factory; and a processor configured to control the respective vehicles in the production factory through the communication module. The processor may identify a first access point that is disabled from communicating with the vehicle control device among the access points for performing the wireless communication with the respective vehicles in the production factory, identify a first vehicle positioned in a disabled communication region corresponding to a coverage of the first access point, transmit a first message, which is intended to be transmitted to the first vehicle, to a second vehicle connected to a second access point through the communication module, and transmit a second message for instructing the second vehicle to move to the disabled communication region.

Still another embodiment of the present disclosure provides an article transport system in a production factory, the article transport system including: vehicles configured to transport articles in the production factory; a vehicle control device configured to control the vehicles; and access points configured to communicate with the vehicle control device through a network and perform wireless communication with the vehicles. The vehicle control device may identify a first access point that is disabled from communicating with the vehicle control device among the access points, identify a first vehicle positioned in a disabled communication region corresponding to a coverage of the first access point, transmit a first message, which is intended to be transmitted to the first vehicle, to a second vehicle connected to a second access point, and transmit a second message for instructing the second vehicle to move to the disabled communication region.

According to the embodiment of the present disclosure, it is possible to enable a vehicle, which is connected to an access point disconnected from the vehicle control device, to communicate with the vehicle control device through another vehicle positioned in a region in which the vehicle may communicate with the vehicle control device.

The effect of the present disclosure is not limited to the above-mentioned effect, and other effects, which are not mentioned above, may be clearly understood by those skilled in the art from the following descriptions.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
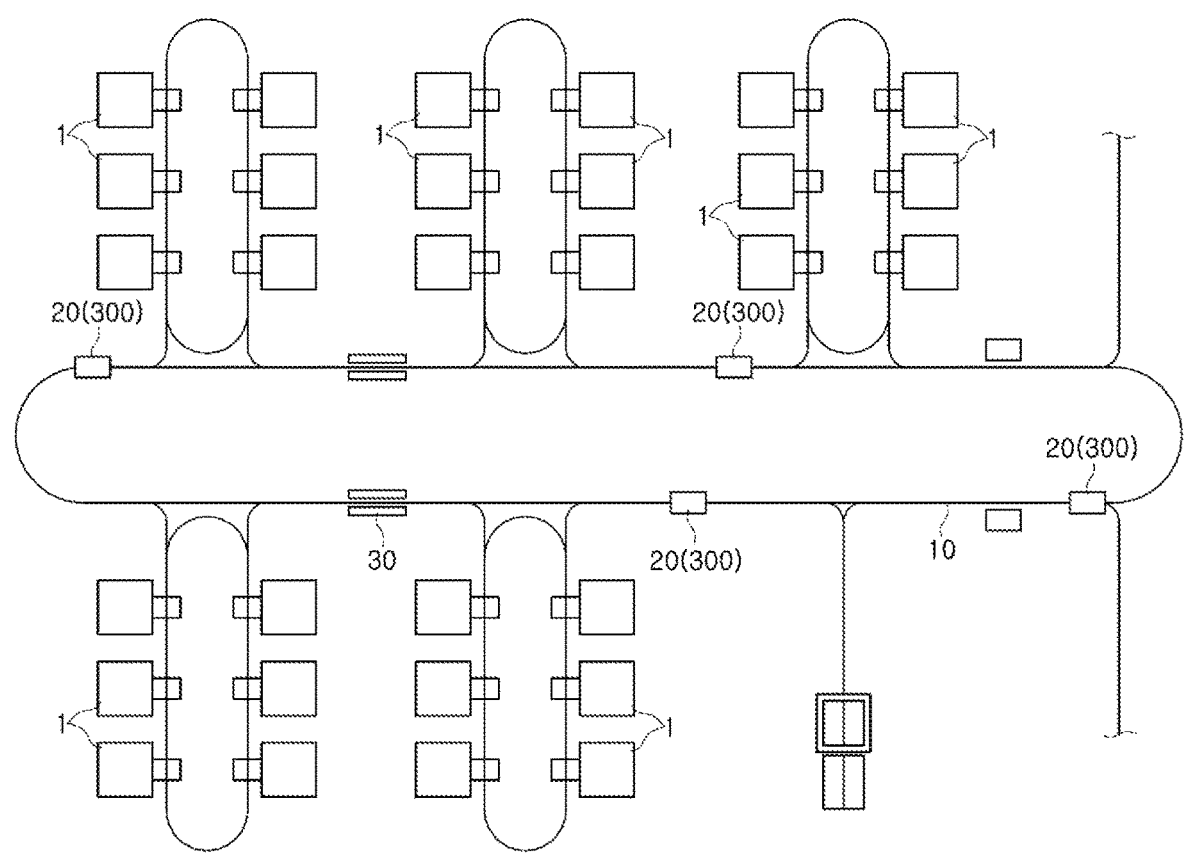
FIG. 1 is a view illustrating an article transport system in a production factory.

Hereinafter, exemplary embodiments of the present invention will be described in detail with reference to the accompanying drawings so that those with ordinary skill in the art to which the present invention pertains may easily carry out the exemplary embodiments. The present disclosure may be implemented in various different ways and is not limited to the embodiments described herein.

A part irrelevant to the description will be omitted to clearly describe the present disclosure, and the same or similar constituent elements will be designated by the same reference numerals throughout the specification.

In addition, the constituent elements having the same configurations in the several embodiments will be assigned with the same reference numerals and described only in the representative embodiment, and only the constituent elements, which are different from the constituent elements according to the representative embodiment, will be described in other embodiments.

Throughout the specification, when one constituent element is referred to as being "connected to (or coupled to)" another constituent element, one constituent element can be "directly connected to (coupled to)" the other constituent element, and one constituent element can also be "indirectly connected to (coupled to)" the other element with other elements interposed therebetween. In addition, unless explicitly described to the contrary, the word "comprise/include" and variations such as "comprises/includes" or "comprising/including" will be understood to imply the inclusion of stated elements, not the exclusion of any other elements.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present application.

FIG. 1 is a view illustrating an article transport system in a production factory. A semiconductor or display manufacturing line includes one or more clean rooms, and a production facility 1 for performing a manufacturing process may be installed in each of the clean rooms. In general, a finally processed substrate (e.g., a wafer) may be completely manufactured by performing a plurality of manufacturing processes on the substrate. When the manufacturing process is completed in the specific semiconductor production facility 1, the substrate is transported to a facility for performing a subsequent manufacturing process. In this case, the substrate may be transported in a state in which the substrate is stored in a container (e.g., a front opening unified pod (FOUP)) capable of accommodating a plurality of substrates. The container, which accommodates the substrates, may be transported by a vehicle (e.g., overhead hoist transport (OHT)) 20.

Vehicles 20 interface with a high-level server (i.e., a vehicle control device 100) in a wireless communication manner while moving along rails 10 installed on a ceiling, and the vehicle control device 100 provides an instruction in relation to a transport task. The vehicle control device 100 receives, from an integrated control system, an instruction on the transport according to a working process. The vehicle control device 100 searches for the shortest route from a starting point to a destination under the instruction of the integrated control system to allow the vehicle 20 to complete a transport task within the shortest time. The vehicle control device 100 selects the vehicle 20 positioned at an optimal position at which the vehicle 20 appropriately performs the transport task, and the vehicle control device 100 provides a transport instruction to the vehicle 20. Under the transport instruction of the vehicle control device 100, the vehicle 20 transports the article from any port to a destination port defined by the instruction of the vehicle control device 100.

Referring to FIG. 1, in the semiconductor or display manufacturing line, the production facilities 1 may be installed to perform the processes, the rails (e.g., ceiling rails) 10 may be provided to define the transport routes for transporting the articles between the production facilities 1, and the plurality of article transport vehicles 20 may be provided to transport the articles to the production facilities 1 while moving along the rails 10. In this case, the article transport vehicle 20 may be supplied with drive power through a power supply unit (e.g., a power supply cable) disposed along the rail 10.

When the article transport vehicle 20 transports the article between the production facilities 1, the article may be transported from a specific production facility directly to another production facility, or the article may be stored in a storage device and then transported to another production facility. A storage device (e.g., an article storage part 30) may be installed at one side of the rail 10. The storage device may include: a stocker provided in the form of a rack and configured to inject an inert gas into the container to maintain a clean environment in the container; and a lateral rail buffer installed adjacent to a lateral side of the rail 10 and configured to store the article, a lower rail buffer installed in a lower region of the rail 10 and configured to store the article, or a maintenance lifter used to maintain and repair the transport vehicle.

Figure 2:
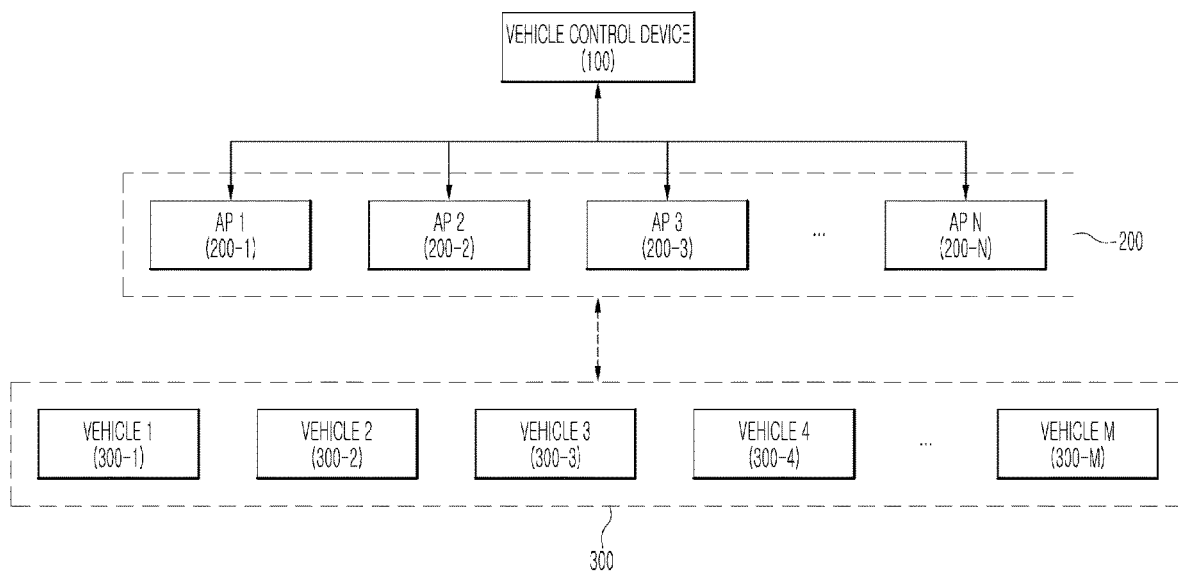
FIG. 2 is a view illustrating an example of a system for controlling a vehicle in the article transport system.

FIG. 2 illustrates an example of a vehicle control system. The vehicle control system according to the embodiment of the present disclosure includes: vehicles 300 configured to transport articles in a production factory; a vehicle control device 100 configured to control the vehicles 300; and access points 200 configured to communicate with the vehicle control device 100 through a network and communicate with the vehicles 300 in a wireless communication manner. As illustrated in FIG. 2, the access point 200 may be provided in plural, and the vehicle 300 may also be provided in plural.

The vehicle control device 100 receives, from the integrated control system, an instruction on the transport according to the working process. The vehicle control device 100 searches for a route from a starting point to a destination under the instruction of the integrated control system to allow the vehicle 300 to perform the corresponding transport task. The vehicle control device 100 selects the vehicle 300 positioned at an optimal position at which the vehicle 300 appropriately performs the transport task, and the vehicle control device 100 transmits a message to instruct the vehicle 300 to transport the article. In addition, the vehicle control device 100 may monitor the states of the respective vehicles 300 (e.g., positions of the vehicles, whether the vehicle moves or stops, whether the vehicle is abnormal, and the like) and output information on the respective vehicles 300 to the user.

The access point 200 is connected to the vehicle control device 100 through a wired network and assists the vehicle 300 in communicating with the vehicle control device 100 in a wireless communication manner. The access point 200 may assign a resource for wireless communication with the vehicle 300 and exchange signals with the vehicle 300 through a wireless channel. The access point 200 may be referred to as a base station. Each of the access points 200 has a region capable of providing the wireless connection. The region in which the access point 200 may provide the wireless connection is referred to as coverage.

The vehicle 300 may communicate with the vehicle control device 100 through the access point 200 in a wireless manner. For example, the vehicle 300 may be connected to the access point 200 in a wireless manner while moving along the rail.

Figure 3:
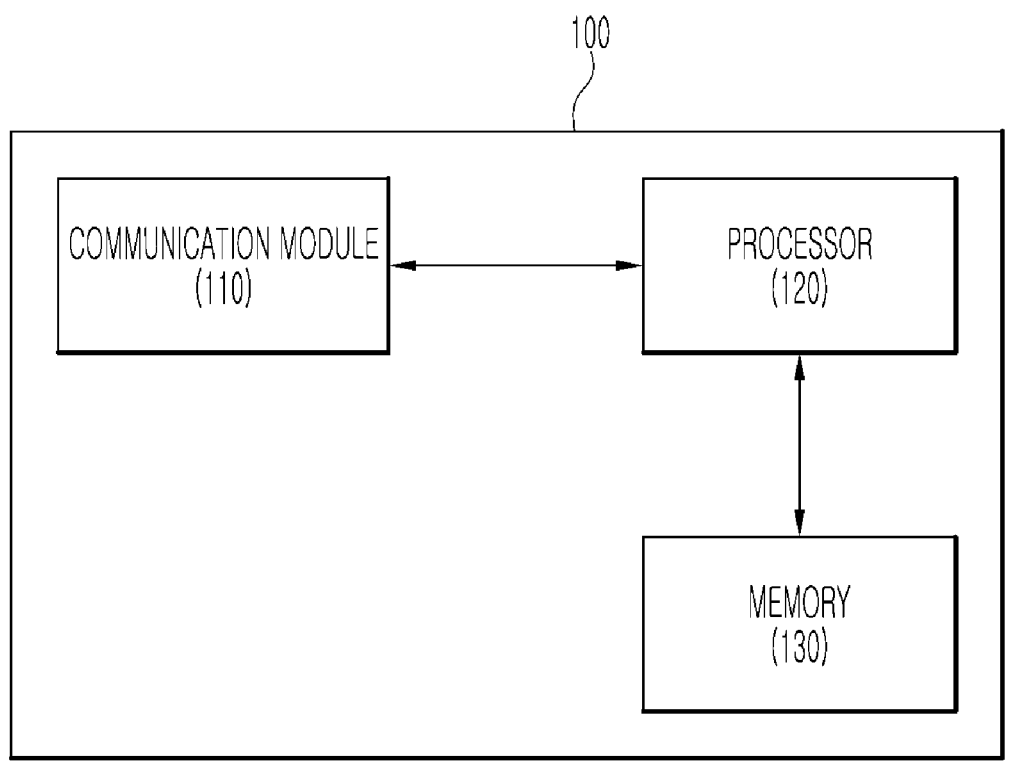
FIG. 3 is a block diagram for explaining a functional configuration of a vehicle control device.

FIG. 3 is a block diagram for explaining a functional configuration of the vehicle control device 100. The vehicle control device 100 according to the embodiment of the present disclosure includes: a communication module 110 configured to allow the respective vehicles in the production factory to communicate with the access points 200 in a wireless manner; and a processor 120 configured to control the respective vehicles 300 in the production factory through the communication module 110. In addition, the vehicle control device 100 may include a memory 130 configured to store information for controlling the respective vehicles 300.

The communication module 110 of the vehicle control device 100 processes signals for communication between the vehicle control device 100 and other elements. For example, the communication module 110 may receive task information (e.g., transport articles and transport positions) from the high-level control system and transmit instructions (e.g., starting points, ending points, routes, and article information) to the vehicles 300. To communicate with the vehicle 300, the communication module 110 transmits a message to the vehicle 300 and transmits identification information on the vehicle 300 to the access point 200 to which the vehicle 300 is connected in a wireless manner.

The processor 120 of the vehicle control device 100 performs arithmetic operations and signal processing to control the respective vehicles 300. The processor 120 may include one or more processing circuits for performing the arithmetic operations and the signal processing. The processor 120 may monitor a state of the article transport system and set a movement route for the vehicle 300 to perform the task received from the high-level control system.

The memory 130 of the vehicle control device 100 may store data required to operate the vehicle control device 100. The memory 130 may store program data for operating the vehicle control device 100, information on the respective vehicles 300, and instructions for controlling the respective vehicles 300.

Figure 4:
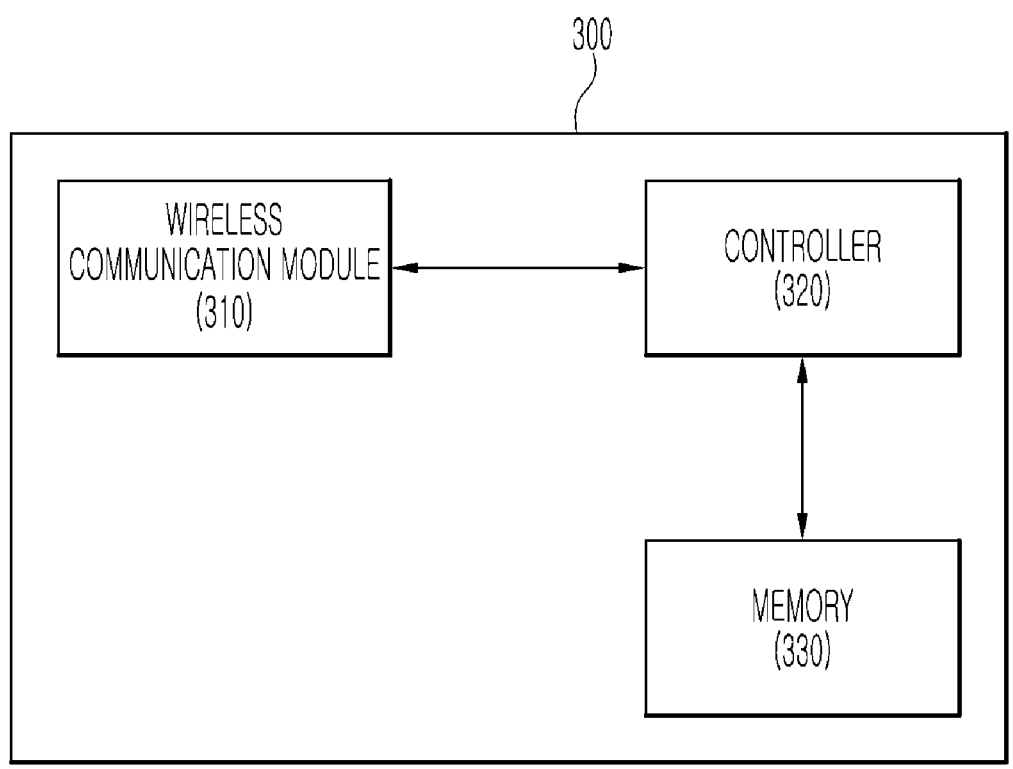
FIG. 4 is a block diagram for explaining a functional configuration of an article transport vehicle.

FIG. 4 is a block diagram for explaining a functional configuration of the vehicle 300 for transporting the article. Referring to FIG. 4, the vehicle 300 may include: a wireless communication module 310 configured to communicate with the vehicle control device 100; a controller 320 configured to control the operations of the vehicles 300; and a memory 330 configured to store information required to operate the vehicles 300.

The wireless communication module 310 transmits or receives signals to enable the vehicle 300 to communicate with the vehicle control device 100. The wireless communication module 310 may transmit or receive the signal through a wireless channel between the access point 200 and the vehicle 300. The communication module 310 may include an antenna, a radio frequency (RF) processing circuit, and a baseband processing circuit to transmit or receive a wireless signal.

The controller 320 may perform arithmetic operations and signal processing to control the operations of the vehicles 300. The controller 320 may include one or more processing circuits for controlling a drive unit (not illustrated) of the vehicle 300.

The memory 330 may store information required to operate the vehicles 300. The memory 330 may store program data required to operate the vehicles 300, information on the states of the vehicles 300, and messages received from the vehicle control device 100.

Figure 5:
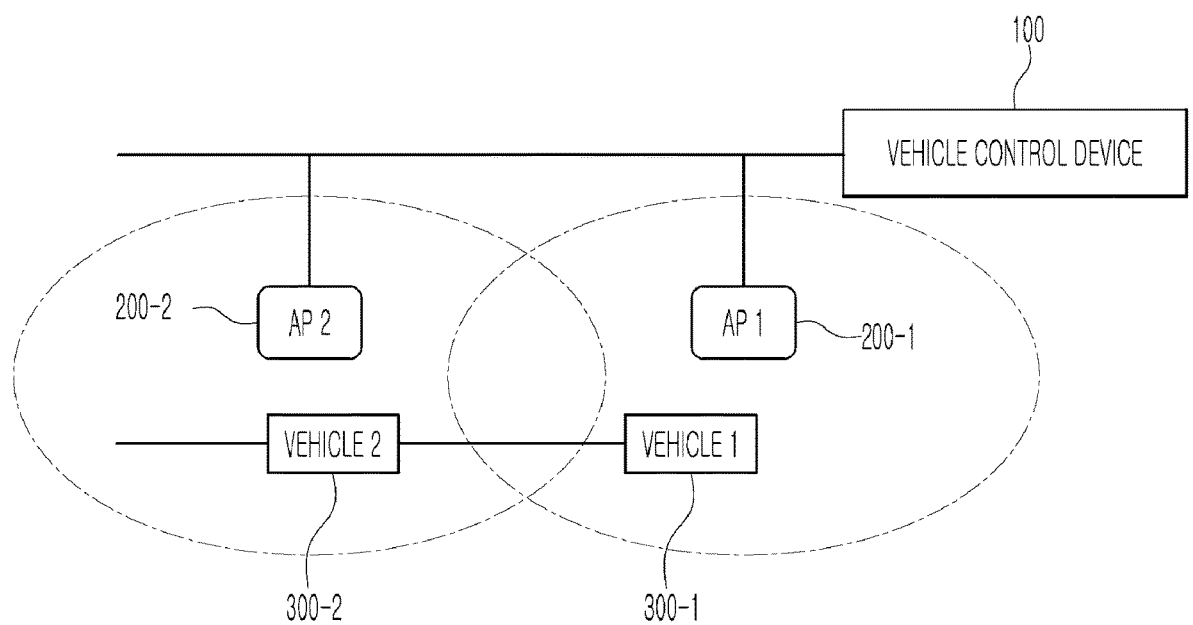
FIG. 5 is a view illustrating an example of a region for wireless connection with access points.

FIG. 5 illustrates an example of a region for wireless connection to the access point. Referring to FIG. 5, the vehicle control device 100 is connected to the access points 200-1 and 200-2 through a wired network, and the access points 200-1 and 200-2 provide a wireless communication environment for the vehicles 300-1 and 300-2. The access points 200-1 and 200-2 each have coverage capable of providing the wireless communication environment. The vehicle 300 may be connected to an enabled communication access point 200 in a wireless manner while moving along the rail 10 and thus communicate with the vehicle control device 100.

Figure 6:
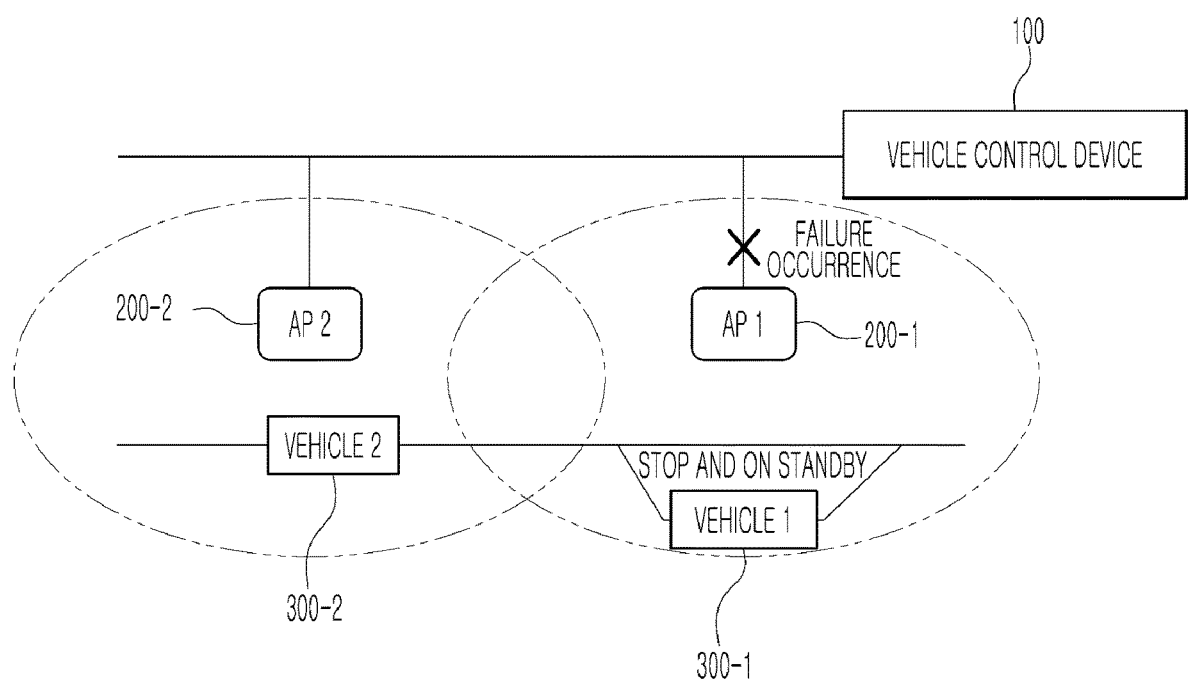
FIG. 6 is a view illustrating a case in which abnormal communication occurs at an access point.

FIG. 6 is a view illustrating a case in which abnormal communication occurs at an access point. Referring to FIG. 6, there may occur a situation in which the wired network partially fails and the first access point 200-1 is disconnected from the vehicle control device 100 or disabled from communicating with the vehicle control device 100. In this case, the first access point 200-1 may communicate with the vehicle 300-1 in a wireless manner but is disabled from communicating with the vehicle control device 100.

According to the embodiment of the present disclosure, when the vehicle control device 100 is disabled from receiving a response signal from the first access point 200-1 for a predetermined period of time (e.g., one minute) or a predetermined number of times or more (e.g., ten times), it can be determined that the first access point 200-1 is in a disabled communication state. Likewise, when the first access point 200-1 is disabled from receiving a response signal from the vehicle control device 100 for a predetermined period of time (e.g., one minute) or a predetermined number of times or more (e.g., ten times), it can be determined that the first access point 200-1 is in the disabled communication state.

In a case in which the first vehicle 300-1 is positioned within the coverage of the first access point 200-1 and connected to the first access point 200-1 in a wireless manner, the first vehicle 300-1 may stop at the current position or a maintenance position and then be on standby until the communication is restarted.

Figure 7:
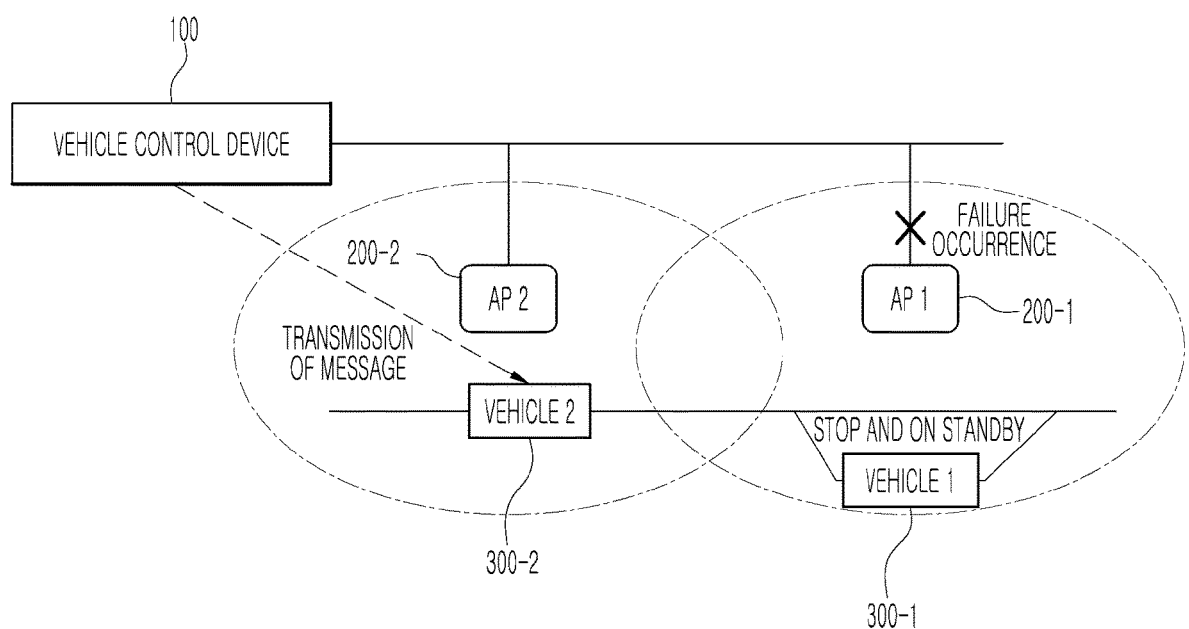
FIGS. 7 and 8 are views illustrating an example of a method of transmitting a message to a vehicle connected to an access point that is disabled from communicating with the vehicle control device.
Figure 8:
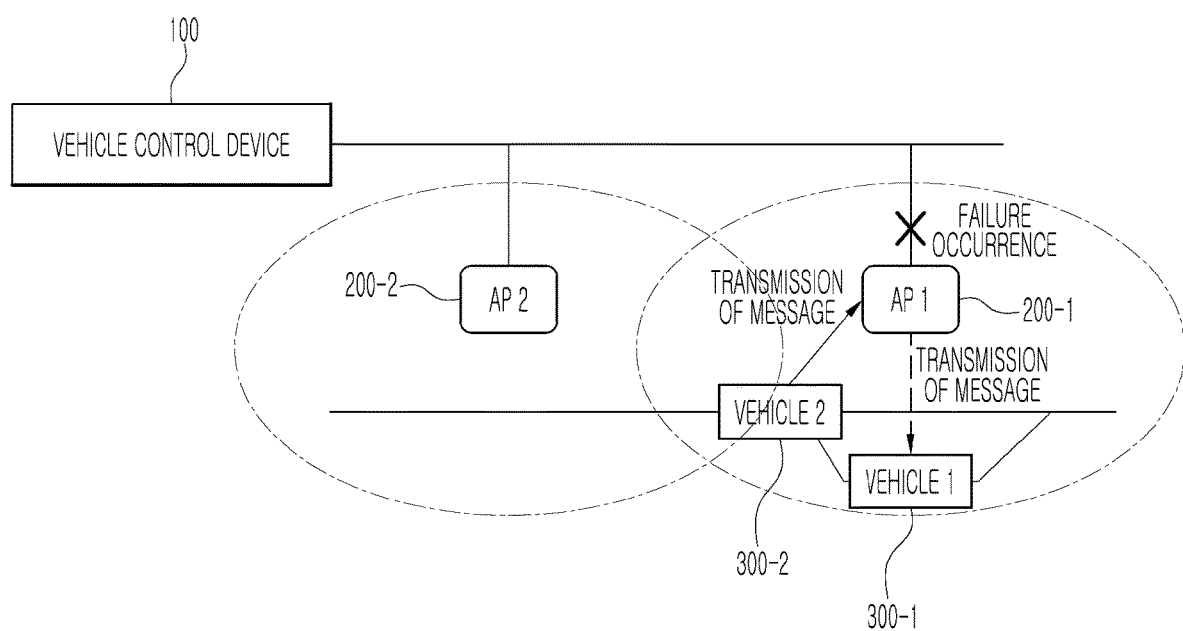

FIGS. 7 and 8 are views illustrating an example of a method of transmitting a message to a vehicle connected to an access point that is disabled from communicating with the vehicle control device.

According to the embodiment of the present disclosure, the vehicle control device 100 may identify the first access point 200-1, which is disabled from communicating with the vehicle control device 100 among the access points 200 for performing the wireless communication with the respective vehicles in the production factory, identify the first vehicle 300-1 positioned in a disabled communication region corresponding to the coverage of the first access point 200-1, transmit a first message, which is intended to be transmitted to the first vehicle 300-1, to the second vehicle 300-2 connected to the second access point 200-2, and transmits a second message for instructing the second vehicle 300-2 to move to the disabled communication region.

In the embodiment of the present disclosure, the first message may include identification information on the first vehicle 300-1, a target movement position of the first vehicle 300-1, and information on a task assigned to the first vehicle 300-1.

In the embodiment of the present disclosure, the second message may include a position of the disabled communication region and an instruction to transmit the first message to the first access point 200-1.

Referring to FIG. 7, when the vehicle control device 100 recognizes a failure of the connection to the first access point 200-1, the vehicle control device 100 searches for an available vehicle (an idle vehicle) among the vehicles adjacent to the first access point 200-1. For example, the vehicle control device 100 may select the second vehicle 300-2 as the available vehicle.

The vehicle control device 100 may transmit a message (the first message), which is intended to be transmitted to the first vehicle 300-1, to the second vehicle 300-2 through the second access point 200-2 to which the second vehicle 300-2 is connected. In addition, the vehicle control device 100 may include an instruction to transmit, to the second vehicle 300-2, the position of the coverage (the disabled communication region) of the first access point 200-1 and transmit the first message to the first access point 200-1.

Referring to FIG. 8, the second vehicle 300-2 enters the coverage of the first access point 200-1 and is connected to the first access point 200-1 in a wireless manner. Further, the second vehicle 300-2 transmits the first message, received from the vehicle control device 100, to the first access point 200-1 and requests the first access point 200-1 to broadcast the first message. The first access point 200-1 broadcasts the first message to the vehicles positioned within the coverage of the first access point 200-1. The first vehicle 300-1 recognizes the identification information included in the first message and moves while recognizing the target movement position and the task included in the first message.

Therefore, even though the first access point 200-1 is disconnected from the vehicle control device 100, the vehicle control device 100 may transmit the message to the first vehicle 300-1 connected, in wireless manner, to the first access point 200-1 in the disabled communication state.

Figure 9:
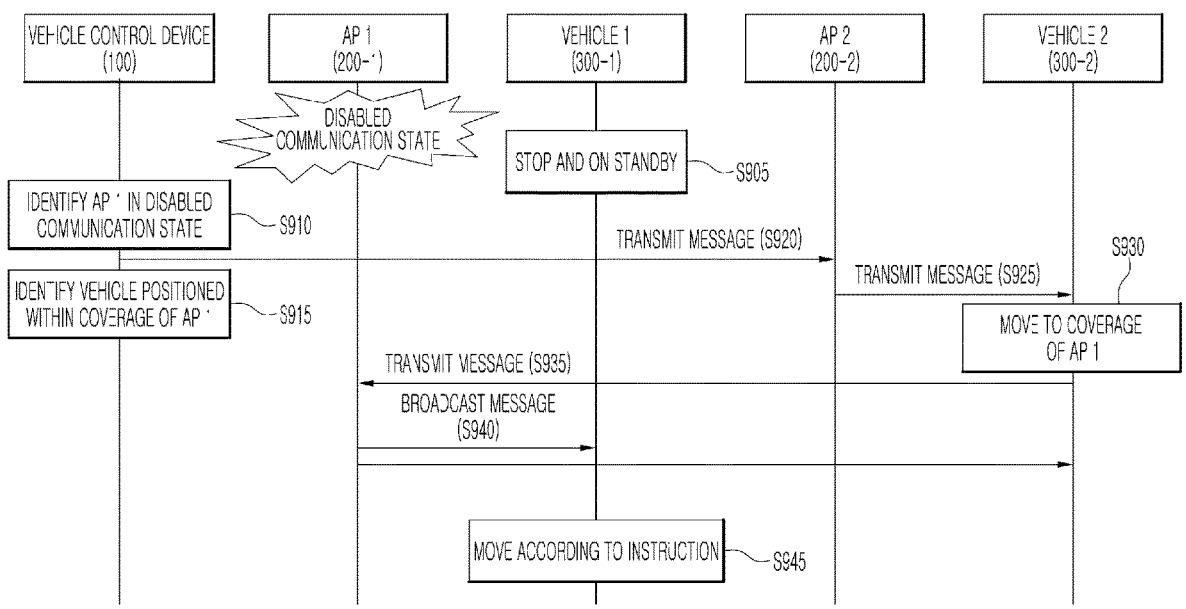
FIG. 9 is a signaling flowchart illustrating a process of transmitting a message to the vehicle connected to the access point that is disabled from communicating with the vehicle control device.

FIG. 9 is a signaling flowchart illustrating a process of transmitting a message to the vehicle connected to the access point that is disabled from communicating with the vehicle control device. Referring to FIG. 9, when the connection between the vehicle control device 100 and the first access point 200-1 fails, the vehicle control device 100 is disconnected from the access point 200-1. When the first vehicle 300-1 connected to the first access point 200-1 recognizes that the first vehicle 300-1 is disabled from communicating with the vehicle control device 100, the first vehicle 300-1 stops at the current position or the maintenance position and is on standby (S905).

The vehicle control device 100 identifies the first access point 200-1 which is disabled from communicating with the vehicle control device 100 among the access points 200 for performing the wireless communication with the respective vehicles in the production factory (S910).

The vehicle control device 100 identifies the first vehicle 300-1 positioned in the disabled communication region corresponding to the coverage of the first access point 200-1. Further, the vehicle control device 100 transmits the first message, which is intended to be transmitted to the first vehicle 300-1, to the second vehicle 300-2 through the second access point 200-2 and transmits the second message for instructing the second vehicle 300-2 to move to the disabled communication region (S925 and S930).

The second vehicle 300-2 moves to the coverage of the first access point 200-1 (S930) and transmits the first message to the first access point 200-1 (S935). The first access point 200-1 broadcasts the first message to the connected vehicles (the first vehicle 300-1 and the second vehicle 300-2). The first vehicle 300-1 receives the first message, recognizes the identification information included in the first message, and moves according to the instruction (the movement position and the task) included in the first message. The message to be broadcasted by the access point 200 may be created based on the user datagram protocol (UDP).

Figure 10:
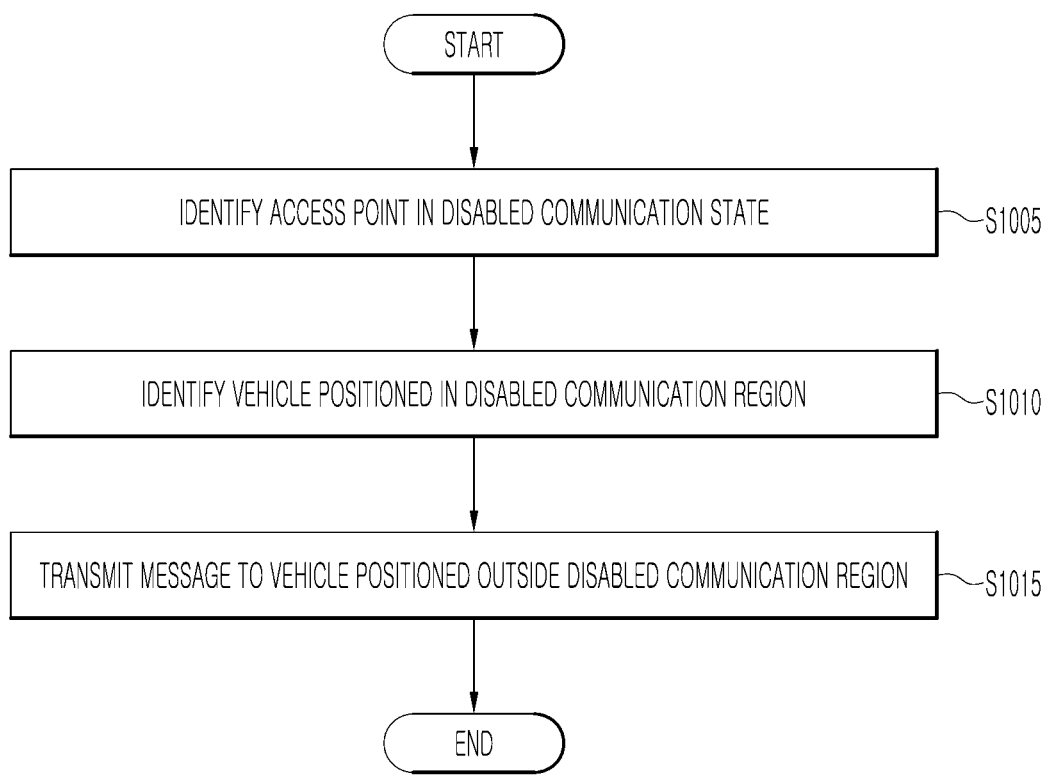
FIG. 10 is a flowchart illustrating an operation of the vehicle control device that transmits a message to the vehicle connected to the access point that is disabled from communicating with the vehicle control device.

FIG. 10 is a flowchart illustrating an operation of the vehicle control device 100 that transmits a message to the vehicle connected to the access point that is disabled from communicating with the vehicle control device. The process illustrated in FIG. 10 may be performed by the vehicle control device 100.

According to the embodiment of the present disclosure, the vehicle control device 100 identifies the first access point 200-1 which is disabled from communicating with the vehicle control device 100 among the access points for performing the wireless communication with the respective vehicles in the production factory (S1005). For example, when the vehicle control device 100 recognizes a failure of the connection to the first access point 200-1, the vehicle control device 100 searches for an available vehicle (an idle vehicle) among the vehicles adjacent to the first access point 200-1. For example, the vehicle control device 100 may select the second vehicle 300-2 as the available vehicle and identify the second access point 200-2 connected to the second vehicle 300-2 in a wireless manner.

The vehicle control device 100 identifies the first vehicle 300-1 positioned in the disabled communication region corresponding to the coverage of the first access point 200-1 (S1010). The vehicle control device 100 may transmit the first message, which is intended to be transmitted to the first vehicle 300-1, to the second vehicle 300-2 connected to the second access point 200-2 and transmit the second message for instructing the second vehicle 300-2 to move to the disabled communication region (S1015).

Figure 11:
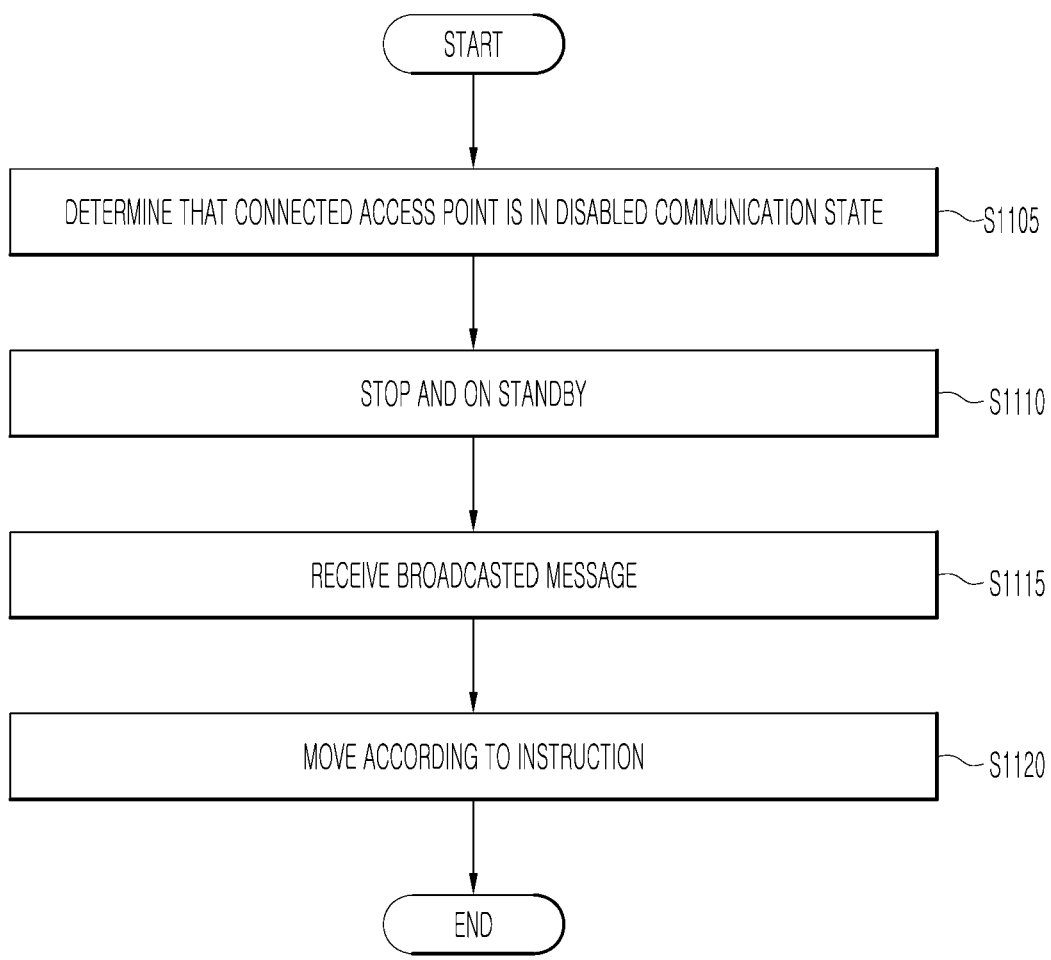
FIG. 11 is a flowchart illustrating an operation of the vehicle that receives a message when the message is transmitted to the vehicle connected to the access point that is disabled from communicating with the vehicle control device.

FIG. 11 is a flowchart illustrating an operation of the vehicle (the first vehicle 300-1) that receives, from the vehicle control device, a message when the message is transmitted to the vehicle connected to the access point (the first access point 200-1) in the disabled communication state.

When the connection between the vehicle control device 100 and the first access point 200-1 fails, the vehicle control device 100 is disconnected from the first access point 200-1. The first vehicle 300-1 connected to the first access point 200-1 recognizes that the first vehicle 300-1 is disabled from communicating with the vehicle control device 100 (S1105), and the first vehicle 300-1 stops at the current position or the maintenance position and is on standby (S1110).

Thereafter, the vehicle control device 100 transmits the first message, which is intended to be transmitted to the first vehicle 300-1, to the second vehicle 300-2 and instructs the second vehicle 300-2 to enter the coverage of the first access point 200-1. The first vehicle 300-1 receives the first message broadcasted from the first access point 200-1 (S1115), recognizes the identification information included in the first message, and moves according to the instruction (the movement position and the task) included in the first message (S1120).

Figure 12:
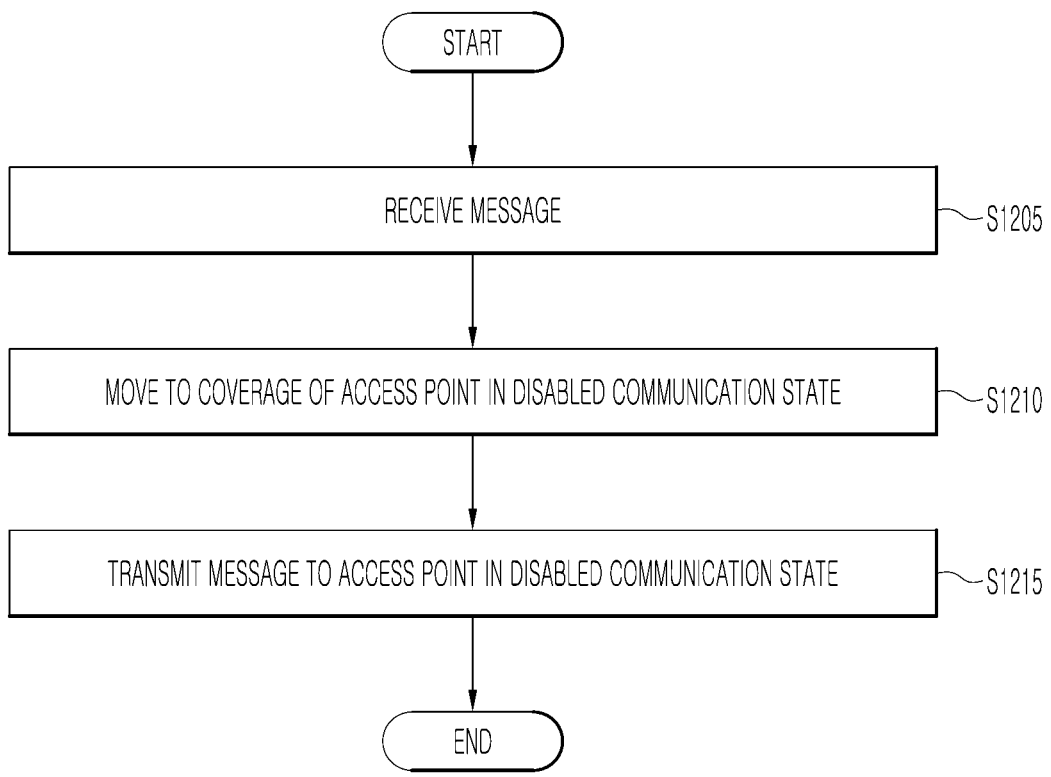
FIG. 12 is a flowchart illustrating an operation of the vehicle that transmits a message when the message is transmitted to the vehicle connected to the access point that is disabled from communicating with the vehicle control device.

FIG. 12 is a flowchart illustrating an operation of the vehicle (the second vehicle 300-2) that transmits a message when the message is transmitted to the vehicle connected to the access point (the first access point 200-1) that is disabled from communicating with the vehicle control device 100.

As described above, the vehicle control device 100 identifies the first access point 200-1 which is disabled from communicating with the vehicle control device 100 among the access points 200 for performing the wireless communication with the respective vehicles in the production factory. The vehicle control device 100 transmits the first message, which is intended to be transmitted to the first vehicle 300-1, to the second vehicle 300-2 through the second access point 200-2 and transmits the second message for instructing the second vehicle 300-2 to move to the disabled communication region.

The second vehicle 300-2 receives the first message and the second message through the second access point 200-2 from the vehicle control device 100 (S1205), moves to the coverage of the first access point 200-1 (S1210), and transmits the first message to the first access point 200-1 (S1215).

Figure 13:
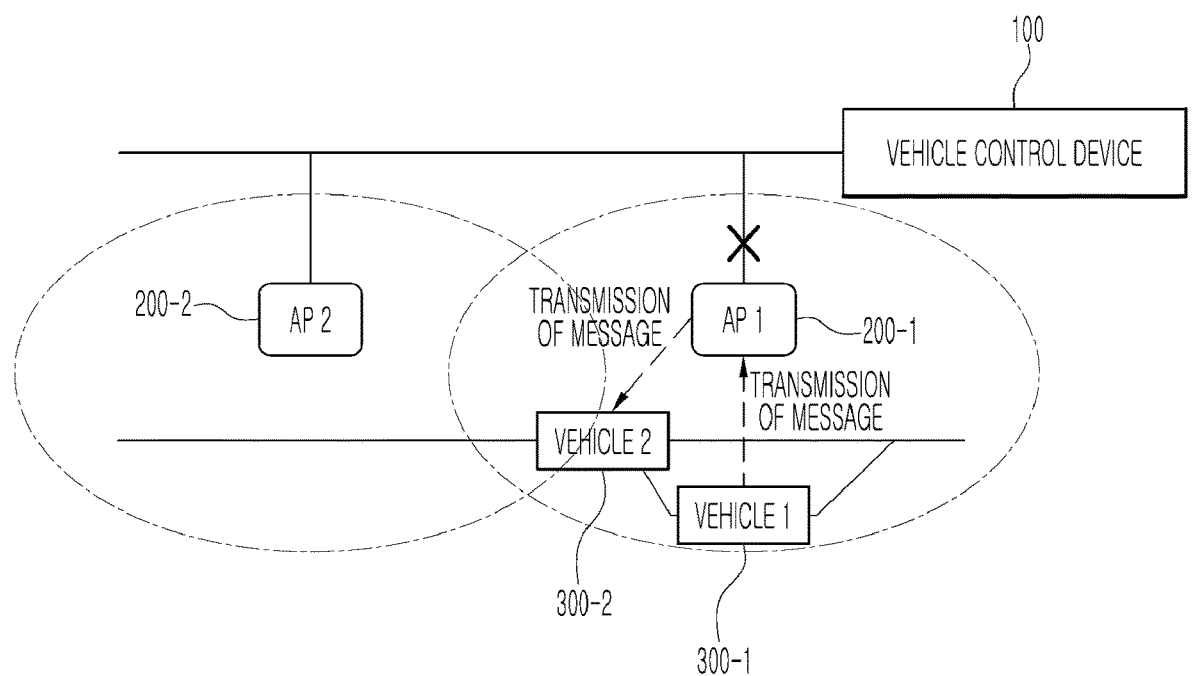
FIGS. 13 and 14 are views illustrating an example of a method of transmitting a message to the vehicle control device from the vehicle connected to the access point that is disabled from communicating with the vehicle control device.
Figure 14:
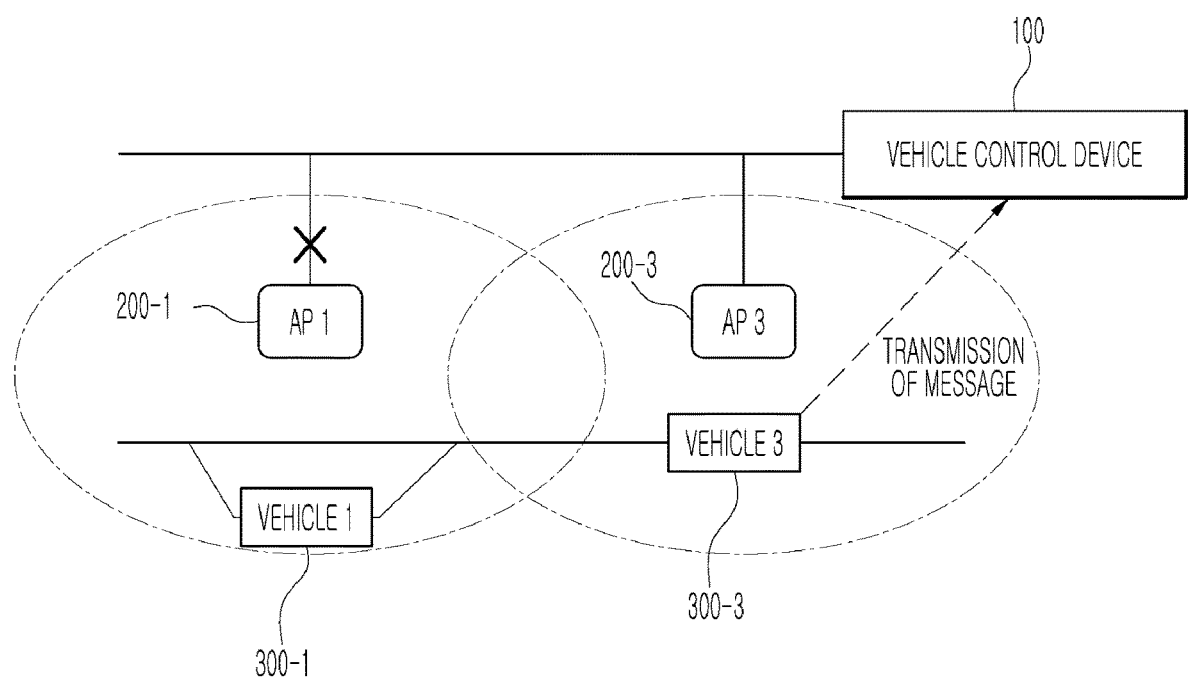

FIGS. 13 and 14 are views illustrating an example of a method of transmitting a message to the vehicle control device 100 from the vehicle (first vehicle 300-1) connected to the access point (the first access point 200-1) that is disabled from communicating with the vehicle control device. As illustrated in FIGS. 13 and 14, the transmission of the message from the first vehicle 300-1 to the vehicle control device 100 may be performed when the first vehicle 300-1, which has received the message from the vehicle control device 100, transmits a response message. In addition, the transmission of the message may also be performed when the first vehicle 300-1 recognizes in advance the failure of the connection between the first access point 200-1 and the vehicle control device 100.

Referring to FIG. 13, the first vehicle 300-1 may transmit the message, which is intended to be transmitted to the vehicle control device 100, to the first access point 200-1 and request the first access point 200-1 to broadcast the message while transmitting the message. In addition, the corresponding message may include an instruction to request the vehicle, which receives the message, to transmit the message to the vehicle control device 100 through another access point. The first access point 200-1, which has received the message from the first vehicle 300-1, transmits the message to the connected vehicles. A third vehicle 300-3, which is moving within the coverage of the first access point 200-1, receives the message from the first access point 200-1 and stores the message.

Referring to FIG. 14, the third vehicle 300-3 may enter the coverage of a third access point 200-3 and be connected to the third access point 200-3 in a wireless manner. The third vehicle 300-3 may transmit the message, received from the first vehicle 300-1, to the vehicle control device 100 through the third access point 200-3.

Therefore, even though the first access point 200-1 is disconnected from the vehicle control device 100, the first vehicle 300-1 connected, in wireless manner, to the first access point 200-1 in the disabled communication state may transmit the message to the vehicle control device 100.

Figure 15:
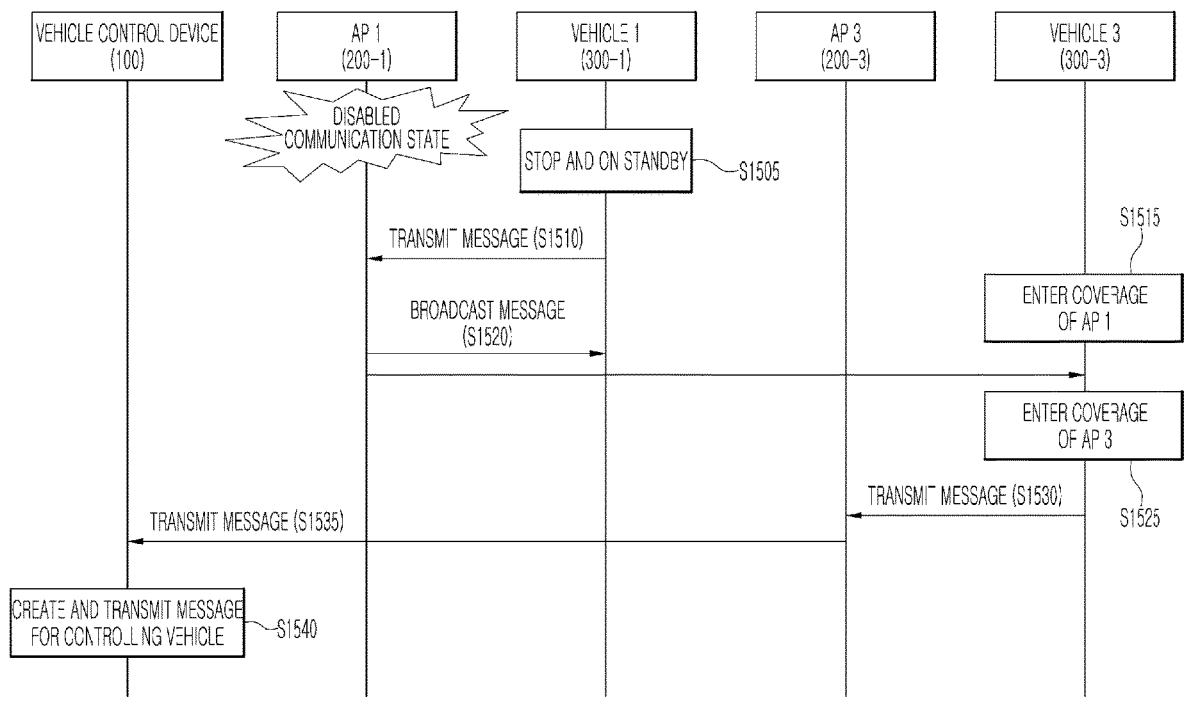
FIG. 15 is a signaling flowchart illustrating a process of transmitting a message to the vehicle control device from the vehicle connected to the access point that is disabled from communicating with the vehicle control device.

FIG. 15 is a signaling flowchart illustrating a process of transmitting a message to the vehicle control device from the vehicle connected to the access point that is disabled from communicating with the vehicle control device.

Referring to FIG. 15, when the connection between the vehicle control device 100 and the first access point 200-1 fails, the vehicle control device 100 is disconnected from the first access point 200-1. When the first vehicle 300-1 connected to the first access point 200-1 recognizes that the first vehicle 300-1 is disabled from communicating with the vehicle control device 100, the first vehicle 300-1 stops at the current position or the maintenance position and is on standby (S1505).

The first vehicle 300-1 transmits the message, which is required to be transmitted to the vehicle control device 100, to the first access point 200-1 (S1510). In this case, the first vehicle 300-1 may request the first access point 200-1 to broadcast the message while transmitting the message. In addition, the corresponding message may include an instruction to request the vehicle, which receives the message, to transmit the message to the vehicle control device 100 through another access point. In the embodiment, the first vehicle 300-1 may transmit a movement request message to the first access point 200-1 with respect to the vehicle control device 100. The first access point 200-1, which has received the message from the first vehicle 300-1, broadcasts the message to the connected vehicles, and the third vehicle 300-3 having entered the coverage of the first access point 200-1 may receive the message from the first access point 200-1 (S1515 and S1520). The third vehicle 300-3 stores the message (the movement request message) received from the first access point 200-1.

Thereafter, the third vehicle 300-3 enters the coverage of the third access point 200-3 that is enabled to communicate with the vehicle control device 100 (S1525). Further, the third vehicle 300-3 transmits the movement request message to the third access point 200-3 (S1530). The third access point 200-3 transmits the movement request message, received from the third vehicle 300-3, to the vehicle control device 100 (S1535). The vehicle control device 100 may receive the movement request message from the third access point 200-3, create a message for controlling the first vehicle 300-1, and transmit the message (S1540).

Figure 16:
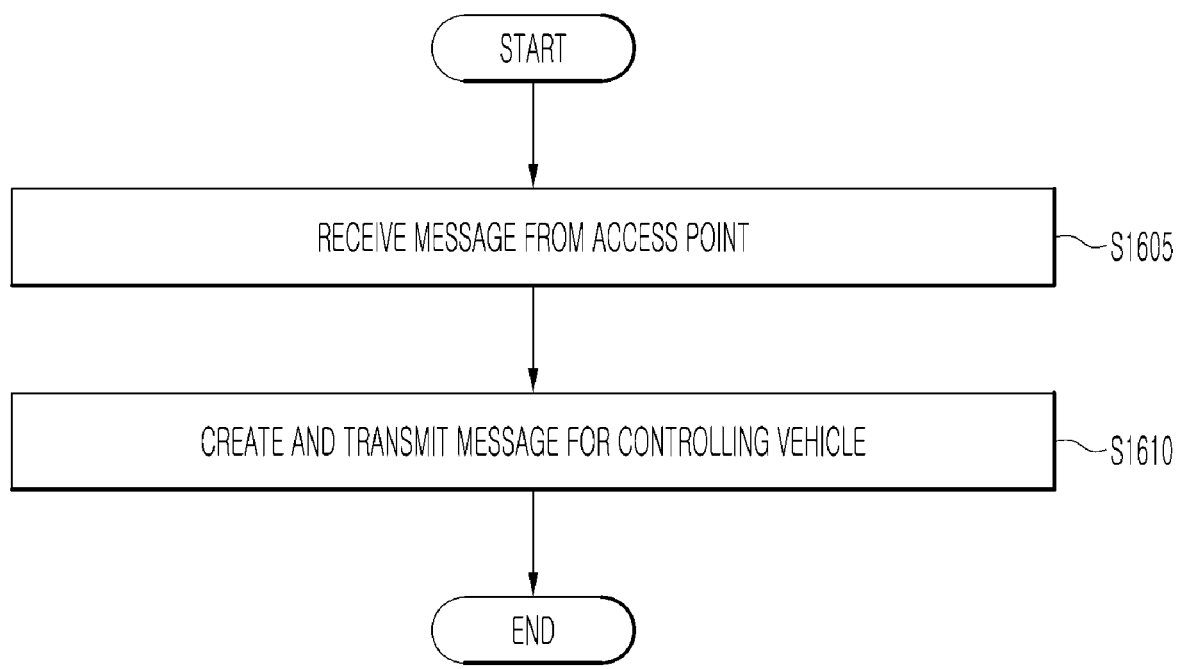
FIG. 16 is a flowchart illustrating an operation of the vehicle control device when the vehicle connected to the access point in a disabled communication state transmits a message to the vehicle control device.

FIG. 16 is a flowchart illustrating an operation of the vehicle control device 100 that transmits a message to the vehicle control device 100 from the vehicle 300-1 connected to the access point (the first access point 200-1) in the disabled communication state. When the connection between the vehicle control device 100 and the first access point 200-1 fails, the vehicle control device 100 is disconnected from the first access point 200-1. In this case, the first vehicle 300-1 may transmit the movement request message to the vehicle control device 100 through another vehicle (the third vehicle 300-3).

The vehicle control device 100 may receive the movement request message from the third access point 200-3 connected to the third vehicle 300-3 (S1605) and transmit the message for controlling the first vehicle 300-1 (S1610). The message for controlling the first vehicle 300-1 may be a message for instructing the first vehicle 300-1 to move out of the disabled communication region or perform another task.

Figure 17:
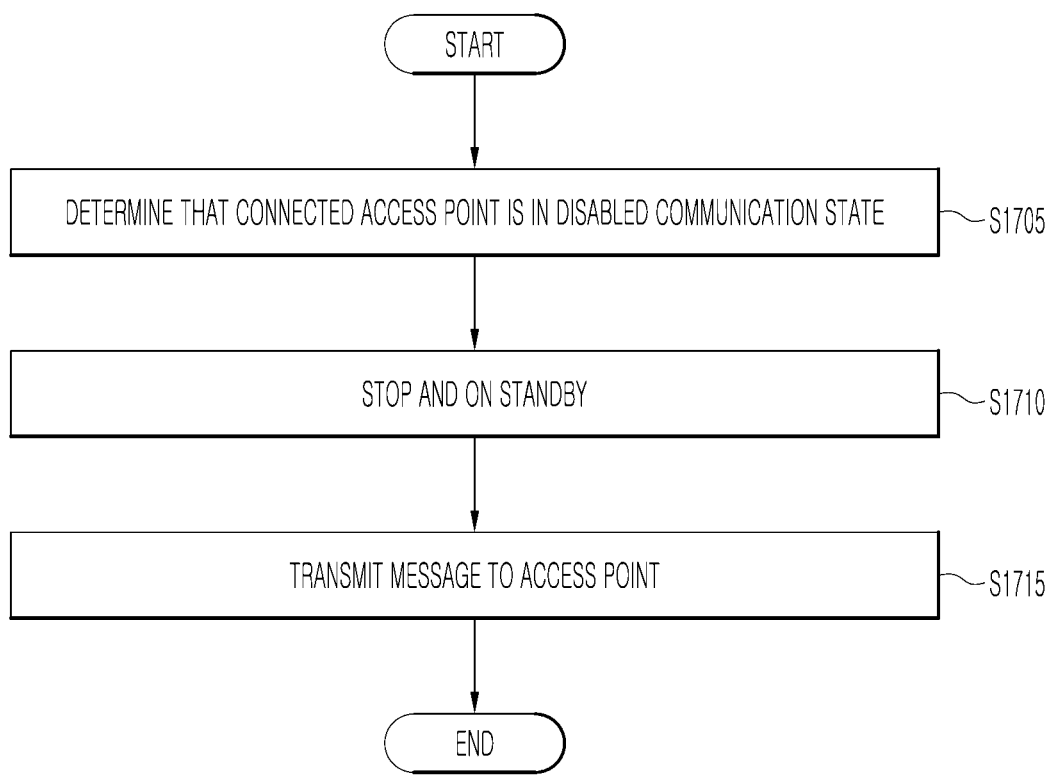
FIG. 17 is a flowchart illustrating an operation of the vehicle that transmits a message when the vehicle connected to the access point in the disabled communication state transmits the message to the vehicle control device.

FIG. 17 is a flowchart illustrating an operation of the vehicle (the first vehicle 300-1) that transmits a message to the vehicle control device 100 from the vehicle (the first vehicle 300-1) connected to the access point (the first access point 200-1) in the disabled communication state.

When the connection between the vehicle control device 100 and the first access point 200-1 fails, the vehicle control device 100 is disconnected from the first access point 200-1. The first vehicle 300-1 connected to the first access point 200-1 recognizes that the first vehicle 300-1 is disabled from communicating with the vehicle control device 100 (S1705), and the first vehicle 300-1 stops at the current position or the maintenance position and is on standby (S1710).

Further, the first vehicle 300-1 transmits the movement request message to the first access point 200-1 with respect to the vehicle control device 100 (S1715). The first vehicle 300-1 may transmit the message for requesting the first access point 200-1 to broadcast the movement request message and also transmit a message for requesting the vehicle, which has received the movement request message, to transmit the corresponding message to the vehicle control device 100 through another access point.

Figure 18:
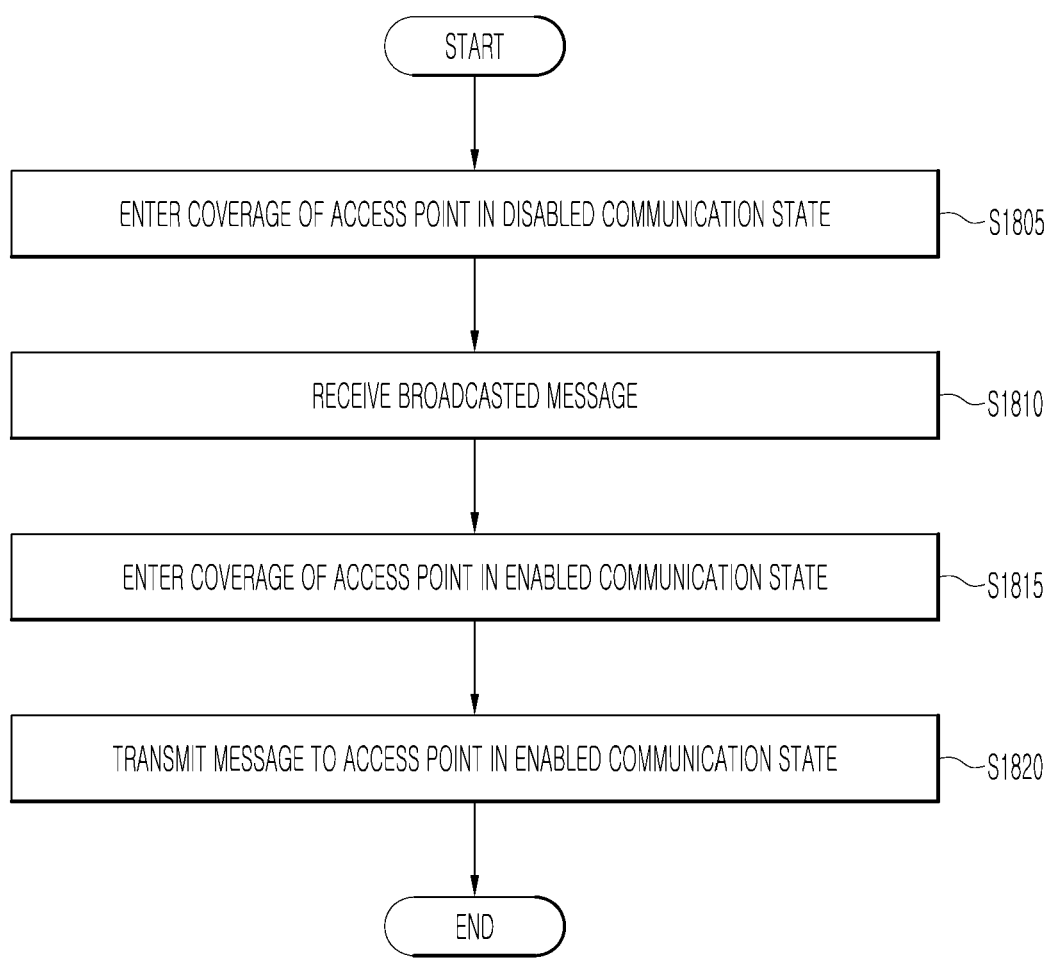
FIG. 18 is a flowchart illustrating an operation of the vehicle that transmits a message when the vehicle connected to the access point in the disabled communication state transmits the message to the vehicle control device.

FIG. 18 is a flowchart illustrating an operation of the vehicle (the third vehicle 300-3) that transmits a message to the vehicle control device 100 from the vehicle (the first vehicle 300-1) connected to the access point (the first access point 200-1) in the disabled communication state.

The third vehicle 300-3 enters the coverage of the first access point 200-1 (S1805) and receives, from the first access point 200-1, the movement request message created by the first vehicle 300-1 (S1810). The third vehicle 300-3 enters the coverage of the third access point 200-3 in an enabled communication state (S1815) and transmits the movement request message to the third access point 200-3 (S1820). The third access point 200-3 may transmit the movement request message to the vehicle control device 100.

The above-mentioned embodiment has been described on the assumption that the vehicle communicates with the access point in a wireless manner. However, the vehicle may transmit the message to the vehicle control device 100 or receive the message from the vehicle control device 100 through the communication (e.g., long term evolution (LTE) communication or device-to-device (D2D) communication) as long as the vehicles may communicate with one another.

In addition, the processing method to which the present disclosure is applied can be produced in the form of a program that is executed on a computer, and the processing method may be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. For example, the computer-readable recording media may include Blu-ray discs (BD), Universal Serial Bus (USB), ROM, PROM, EPROM, EEPROM, RAM, CD-ROM, magnetic tapes, floppy discs, and optical data storage devices. In addition, the computer-readable recording media include media implemented in the form of carrier waves (e.g., transmission over the Internet). In addition, bitstreams generated by encoding methods may be stored in the computer-readable recording medium or transmitted through a wired/wireless communication network.

In addition, the embodiment of the present disclosure may be implemented as computer program products by program codes, and the program code may be executed on the computer by the embodiment of the present disclosure. The program code may be stored in a computer-readable carrier.

A non-transitory computer-readable medium according to the embodiment of the present disclosure stores one or more instructions executed by one or more processors. The instructions for performing the method of operating a vehicle control device according to the embodiment of the present disclosure may be stored in the non-transitory computer-readable medium.

The present embodiments and the drawings attached to the present specification clearly show only a part of the technical spirit included in the present disclosure. It will be apparent that all the modified examples and the specific embodiments, which may be easily inferred by those skilled in the art within the scope of the technical spirit included in the specification and the drawings of the present disclosure, are included in the scope of the present disclosure.

Accordingly, the spirit of the present disclosure should not be limited to the described embodiment, and all of the equivalents or equivalent modifications of the claims as well as the appended claims belong to the scope of the spirit of the present disclosure.

What is claimed is:

1. A method of operating a vehicle control device for an article transport system in a production factory, the method comprising:
   identifying a first access point that is disabled from communicating with the vehicle control device among access points for performing wireless communication with respective vehicles in the production factory;
   identifying a first vehicle positioned in a disabled communication region corresponding to a coverage of the first access point; and
   transmitting a first message, which is intended to be transmitted to the first vehicle, to a second vehicle connected to a second access point; and
   causing the second vehicle to:
      move, after the transmitting of the first message to the second vehicle, to the disabled communication region; and
      transmit the first message to the first access point which transmits the first message to the first vehicle.

2. The method of claim 1,
   wherein the first message includes identification information on the first vehicle, a target movement position of the first vehicle, and information on a task assigned to the first vehicle.

3. The method of claim 1,
   wherein the causing the second vehicle includes:
      transmitting a second message for instructing the second vehicle to move to the disabled communication region, and
   wherein the second message includes a position of the disabled communication region and an instruction to transmit the first message to the first access point.

4. The method of claim 1,
   wherein the identifying of the first access point that is disabled from communicating with the vehicle control device comprises
      determining that the first access point is in a disabled communication state when the vehicle control device is disabled from receiving a signal from the first access point for a predetermined period of time or a predetermined number of times or more.

5. The method of claim 1, further comprising:
   receiving a response message from the first vehicle through a third access point.

6. A vehicle control device for an article transport system in a production factory, the vehicle control device comprising:
   a communication module configured to communicate with access points for performing wireless communication with respective vehicles in the production factory; and
   a processor configured to control the respective vehicles in the production factory through the communication module,
   wherein the processor:
      identifies a first access point that is disabled from communicating with the vehicle control device among the access points for performing the wireless communication with the respective vehicles in the production factory,
      identifies a first vehicle positioned in a disabled communication region corresponding to a coverage of the first access point,
      transmits a first message, which is intended to be transmitted to the first vehicle, to a second vehicle connected to a second access point through the communication module, and
      causes, using a second message, the second vehicle to:
         move to the disabled communication region; and
         transmit the first message to the first access point which transmits the first message to the first vehicle.

7. The vehicle control device of claim 6,
   wherein the first message includes identification information on the first vehicle, a target movement position of the first vehicle, and information on a task assigned to the first vehicle.

8. The vehicle control device of claim 6,
   wherein the processor transmits the second message to the second vehicle, and
   wherein the second message includes a position of the disabled communication region and an instruction to transmit the first message to the first access point.

9. The vehicle control device of claim 6,
   wherein the processor determines that the first access point is in a disabled communication state when the processor is disabled from receiving a response message from the first access point for a predetermined period of time or a predetermined number of times or more.

10. The vehicle control device of claim 6,
    wherein the communication module receives a response message from the first vehicle through a third access point.

11. An article transport system in a production factory, the article transport system comprising:
    vehicles configured to transport articles in the production factory;
    a vehicle control device configured to control the vehicles; and
    access points configured to communicate with the vehicle control device through a network and perform wireless communication with the vehicles,
    wherein the vehicle control device:

identifies a first access point that is disabled from communicating with the vehicle control device among the access points, identifies a first vehicle positioned in a disabled communication region corresponding to a coverage of the first access point, transmits a first message, which is intended to be transmitted to the first vehicle, to a second vehicle connected to a second access point, and causes, using a second message, the second vehicle to: move to the disabled communication region, and transmit the first message to the first access point which transmits the first message to the first vehicle.

12. The article transport system of claim 11, wherein the first message includes identification information on the first vehicle, a target movement position of the first vehicle, and information on a task assigned to the first vehicle.

13. The article transport system of claim 11,
wherein the vehicle control device transmits the second message to the second vehicle, and
wherein the second message includes a position of the disabled communication region and an instruction to transmit the first message to the first access point.

14. The article transport system of claim 11, wherein the vehicle control device determines that the first access point is in a disabled communication state when the vehicle control device is disabled from receiving a signal from the first access point for a predetermined period of time or a predetermined number of times or more.

15. The article transport system of claim 11, wherein the second vehicle moves to the coverage of the first access point and transmits the first message to the first access point, and the first access point transmits the first message by broadcasting the first message to vehicles connected to the first access point.

16. The article transport system of claim 15, wherein when the first vehicle determines that the connected first access point is in a disabled communication state, the first vehicle stops at a current position or a maintenance position, is on standby, receives the first message from the first access point, and moves to a target movement position based on the first message.

17. The article transport system of claim 11, wherein when the first vehicle determines that the connected first access point is in a disabled communication state, the first vehicle stops at a current position or a maintenance position, is on standby, and transmits a movement request message to the first access point with respect to the vehicle control device.

18. The article transport system of claim 17, wherein the first access point receives the movement request message from the first vehicle and transmits the movement request message by broadcasting the movement request message to vehicles connected to the first access point.

19. The article transport system of claim 18, wherein a third vehicle, which enters the disabled communication region, enters the coverage of the first access point, receives the movement request message from the first access point, enters a coverage of a third access point in an enabled communication state, and transmits the movement request message to the third access point.

20. The article transport system of claim 19, wherein the third access point transmits the movement request message to the vehicle control device, and the vehicle control device receives the movement request message from the third access point and transmits a message for controlling the first vehicle.

* * * * *